US012676467B2

(12) United States Patent
Yang

(10) Patent No.: US 12,676,467 B2
(45) Date of Patent: Jul. 7, 2026

(54) POWER CORD PHOTOCOUPLER LEAKAGE CURRENT DETECTION INTERRUPTER (LCDI) AND ELECTRICAL APPLIANCE USING SAME

(71) Applicant: Dongguan Tuocheng Industrial Co., Ltd, Dongguan (CN)

(72) Inventor: Juntuo Yang, Dongguan (CN)

(73) Assignee: Dongguan Tuccheng Industrial Co., Ltd, Dongguan (CN)

( * ) Notice: Subject to any disclaimer, the term of this patent is extended or adjusted under 35 U.S.C. 154(b) by 191 days.

(21) Appl. No.: 18/648,592

(22) Filed: Apr. 29, 2024

(65) Prior Publication Data

US 2025/0309631 A1 Oct. 2, 2025

(30) Foreign Application Priority Data

Mar. 29, 2024 (CN) .......................... 202410382819.2

(51) Int. Cl.
H02H 1/00 (2006.01)
H02H 3/04 (2006.01)
H02H 3/16 (2006.01)

(52) U.S. Cl.
CPC .......... H02H 1/0023 (2013.01); H02H 3/044 (2013.01); H02H 3/162 (2013.01)

(58) Field of Classification Search
CPC .... G01R 31/52; H02H 1/0007; H02H 1/0023; H02H 3/044; H02H 3/05; H02H 3/162; H02H 3/32

USPC .......................................................... 361/42
See application file for complete search history.

(56) References Cited

U.S. PATENT DOCUMENTS

2004/0037018 A1* 2/2004 Kim ....................... H02H 3/338
361/42
2019/0115748 A1* 4/2019 Li ......................... H01R 13/713

FOREIGN PATENT DOCUMENTS

CN 114566942 A * 5/2022 ........... H02H 1/0007

OTHER PUBLICATIONS

Machine translation of Zou et al. Chinese Patent Document CN 114566942 A May 2022 (Year: 2022).*

* cited by examiner

*Primary Examiner* — Kevin J Comber
(74) *Attorney, Agent, or Firm* — Bayramoglu Law Offices LLC

(57) ABSTRACT
A power cord photocoupler leakage current detection interrupter (LCDI) includes: a switch unit provided between an input terminal and an output terminal, and configured to control the input terminal and the output terminal to turn on or off; a leakage current detection line wrapped with a power cord connected between the switch unit and the output terminal, and configured to detect whether the power cord has a leakage current; and a leakage current interruption unit connected to the switch unit and the leakage current detection line, and configured to detect a leakage current signal of the leakage current detection line, and send a corresponding control signal to the switch unit according to the leakage current signal.

14 Claims, 4 Drawing Sheets

POWER CORD PHOTOCOUPLER LEAKAGE CURRENT DETECTION INTERRUPTER (LCDI) AND ELECTRICAL APPLIANCE USING SAME

CROSS-REFERENCE TO THE RELATED APPLICATIONS

This application is based upon and claims priority to Chinese Patent Application No. 202410382819.2, filed on Mar. 29, 2024, the entire contents of which are incorporated herein by reference.

TECHNICAL FIELD

The present disclosure relates to the electrical field, and in particular to a power cord photocoupler leakage current detection interrupter (LCDI) and an electrical appliance using same.

BACKGROUND

The power cord leakage current detection interrupter (LCDI) is a safety device for protecting against fires in electricity utilization, and mainly includes a power cord with a plug. It is mainly intended to detect a leakage current between a live line or a neutral line and a protective shielding layer of the power cord from the power plug to the loaded electrical appliance such as an air conditioner and a dehumidifier. In case of the leakage current, the power cord LCDI cuts off a power supply of the electrical appliance to prevent the fire and to ensure safety. In order to prevent the arc-fault-induced fire for the damage and the reduced insulating strength of the power cord due to a fact that the live line, the neutral line and the ground line in the power cord are aged, worn, squeezed or bitten by animals, a power cord LCDI capable of detecting a leakage current detection line is needed urgently.

SUMMARY

The present disclosure automatically detects a power cord through a photocoupler leakage current detection module, and manually tests the power cord through a test unit, thereby improving safety of a power cord LCDI.

To achieve the above objective, the present disclosure adopts the following technical solutions: A power cord photocoupler LCDI includes: a switch unit provided between an input terminal and an output terminal, and configured to control the input terminal and the output terminal to turn on or off;

a leakage current detection line wrapped with a power cord connected between the switch unit and the output terminal, and configured to detect whether the power cord has a leakage current; and a leakage current interruption unit connected to the switch unit and the leakage current detection line, and configured to detect a leakage current signal of the leakage current detection line, and send a corresponding control signal to the switch unit according to the leakage current signal.

As a further solution of the present disclosure, the leakage current interruption unit includes a photocoupler leakage current detection module and a switch drive module;

the photocoupler leakage current detection module includes one path connected to the leakage current detection line, and another path connected to the switch drive module;

the photocoupler leakage current detection module is configured to generate and send the control signal to the switch drive module when detecting the leakage current signal of the leakage current detection line; and a control terminal of the switch drive module is electrically connected to the switch unit; and the switch drive module is configured to generate the corresponding control signal according to the leakage current signal, thereby controlling the switch unit to turn off.

As a further solution of the present disclosure, the power cord photocoupler LCDI further includes a test unit; the test unit is connected between the input terminal and the output terminal and connected to the leakage current detection line; and the test unit is configured to inject a current into the leakage current detection line in an on state; and the leakage current detection line is further configured to generate a leakage current signal according to an injected current.

As a further solution of the present disclosure, the photocoupler leakage current detection module includes a ninth resistor R9, a tenth resistor R10, an eleventh resistor R11, a second rectifier D2, a fourth resistor R4 and a photocoupler U1;

one path of an input-terminal line L is connected to an input-terminal line N through the ninth resistor R9 and the tenth resistor R10 to form a voltage regulating loop;

a first input terminal of the second rectifier D2 is connected to the voltage regulating loop; and another path of the input-terminal line L is connected to a second input terminal of the second rectifier D2 through the eleventh resistor R11; and an output terminal of the second rectifier D2 includes one path connected to the photocoupler U1 through the fourth resistor R4.

As a further solution of the present disclosure, the switch drive module includes a solenoid SOL, a first rectifier D1, a fifth resistor R5, the photocoupler U1, a first resistor R1, a sixth resistor R6 and a silicon controlled rectifier SCR;

one path of the input-terminal line L is grounded through the solenoid SOL, the first rectifier D1, the fifth resistor R5 and the sixth resistor R6 to form a static loop; and the static loop is a current loop when the photocoupler U1 is not triggered;

the photocoupler U1 includes one path connected between the fifth resistor R5 and the sixth resistor R6 in the static loop, and another path connected to a gate of the silicon controlled rectifier SCR through the first resistor R1 to form a trigger loop; and the trigger loop is a current loop when the photocoupler U1 is triggered;

the silicon controlled rectifier SCR includes an anode connected to a front terminal of the fifth resistor R5 in the static loop, the gate connected to the trigger loop, and a cathode grounded; and the trigger loop is configured to trigger the silicon controlled rectifier SCR to turn on.

As a further solution of the present disclosure, the test unit includes a test switch TEST, an additional signal line and a twelfth resistor R0; and one path of an input-terminal line L is connected to an input-terminal line N through the test switch TEST, the additional signal line and the twelfth resistor R0 to form a test loop; and the leakage current detection line is connected between the test switch TEST and the twelfth resistor R0.

As a further solution of the present disclosure, the power cord photocoupler LCDI further includes a plug portion and the power cord; and the power cord is externally connected to the plug portion;

the plug portion is configured to mount the switch unit, the leakage current interruption unit and the test unit; and the power cord includes an insulated protective layer, a metal outer layer, a live line L, a neutral line N, a ground line G, the leakage current detection line, the additional signal line and the twelfth resistor R0; the insulated protective layer covers the metal outer layer; and the metal outer layer covers the live line L, the neutral line N, the ground line G, the leakage current detection line, the additional signal line and the twelfth resistor R0.

As a further solution of the present disclosure, the plug portion is further provided with a test switch TEST button and a reset switch RESET button.

As a further solution of the present disclosure, the plug portion is further provided with a startup indication lamp; and the startup indication lamp is connected to a power loop.

The present disclosure further provides an electrical appliance using the power cord photocoupler LCDI.

The present disclosure has the following beneficial effects: By implementing the technical solutions of the present disclosure, the power cord photocoupler LCDI performs leakage current detection through photoelectric signal conversion of the photocoupler, and has the advantages of a simple circuit structure, a low cost, etc.

Meanwhile, the power cord photocoupler LCDI has an automatic leakage current detection function and a manual leakage current detection function. With the dual leakage current detection functions, the present disclosure effectively improves the safety of the product.

DETAILED DESCRIPTION OF THE EMBODIMENTS

The technical solutions in the embodiments of the present disclosure are clearly and completely described below with reference to the drawings in the embodiments of the present disclosure. Apparently, the described embodiments are merely a part rather than all of the embodiments of the present disclosure.

Embodiment 1

An objective of the present disclosure is to provide a power cord photocoupler LCDI. The device has an automatic leakage current detection function and a manual leakage current detection function.

Specifically, leakage current interruption unit 104 of the device includes photocoupler leakage current detection module 104b and switch drive module 104a. The leakage current interruption unit 104 is configured to detect and monitor whether a leakage current detection line in power cord 2 is disconnected. When the leakage current detection line in the power cord 2 is disconnected, the device automatically cuts off a power supply to ensure safety of an electrical appliance.

Specifically, the manual leakage current detection function is achieved by manually closing a test switch. By forcibly connecting the leakage current detection line 26, whether the device cuts off the power supply can be detected.

Figure 3:
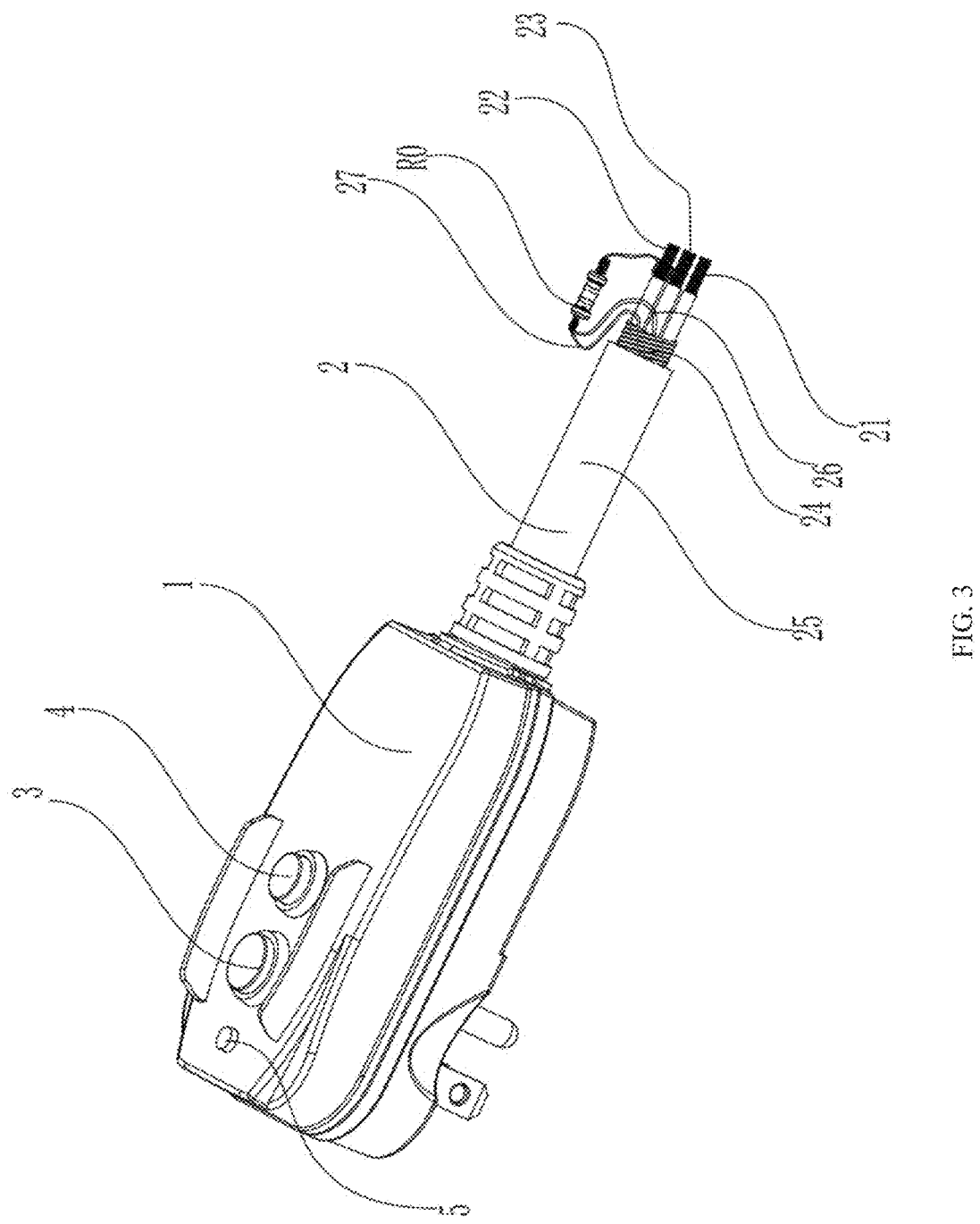
FIG. 3 schematically illustrates a structure of a power cord photocoupler LCDI according to the present disclosure.
Figure 4:
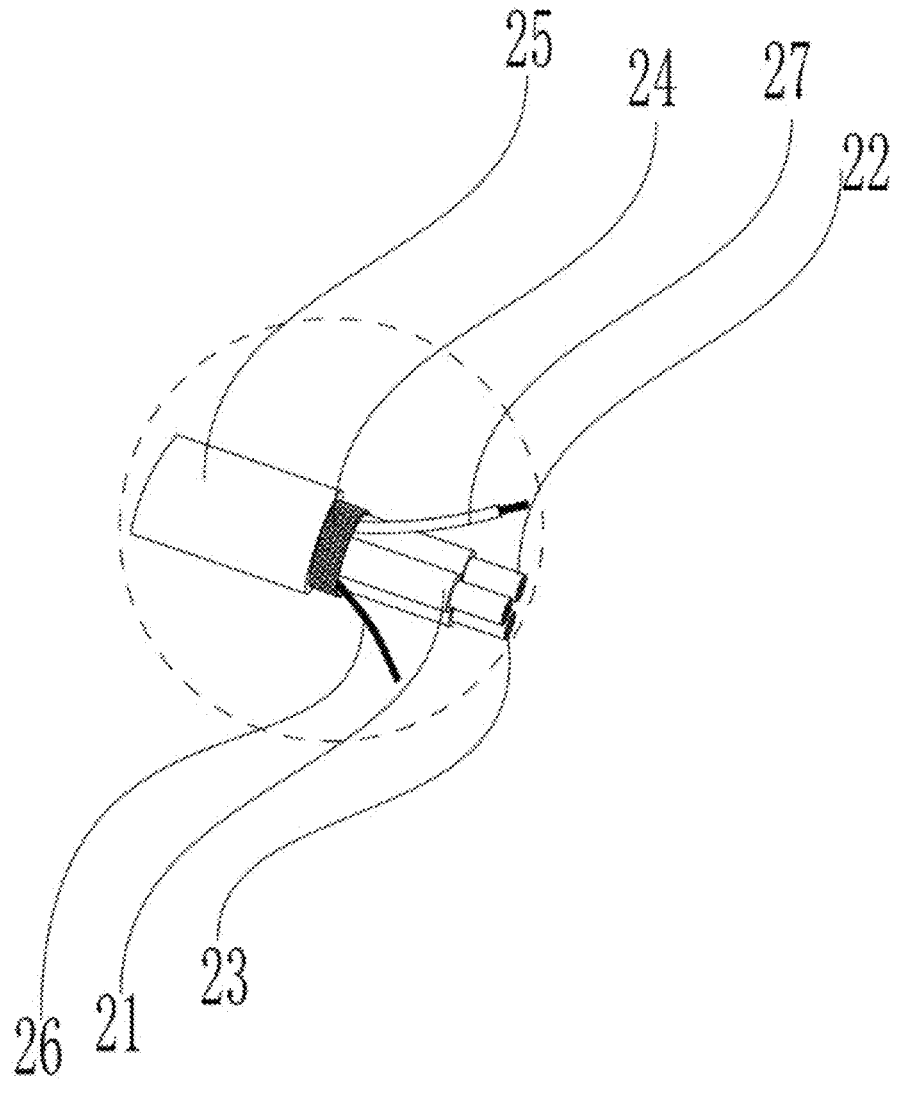
FIG. 4 is a partially enlarged view of a power cord photocoupler LCDI according to the present disclosure.

As shown in FIG. 3 to FIG. 4, the power cord photocoupler LCDI provided by the present disclosure includes plug portion 1 and power cord 2. An inner cavity of the plug portion 1 is configured to mount a circuit module integrated by switch unit 103, the leakage current interruption unit 104 and the test unit. The power cord includes live line L 21, neutral line N 22, ground line G 23, metal outer layer 24, insulated protective layer 25, the leakage current detection line 26, additional signal line 27 and twelfth resistor R0. The insulated protective layer 25 covers the metal outer layer 24. The metal outer layer 24 covers the live line L 21, the neutral line N 22, the ground line G 23, the leakage current detection line 26, the additional signal line 27 and the twelfth resistor R0 to form the external power cord 2. The power cord 2 is externally connected to the plug portion 1, and configured to supply power to the electrical appliance. The plug portion 1 is further provided with test switch TEST 4 button, reset switch RESET 3 button and startup indication lamp 5. The test switch TEST 4 button is configured to test a switch of a loop. The reset switch RESET 3 button is configured to start up and shut down the power cord photocoupler LCDI. The startup indication lamp 5 is configured to display whether the power cord photocoupler LCDI is started up.

Figure 1:
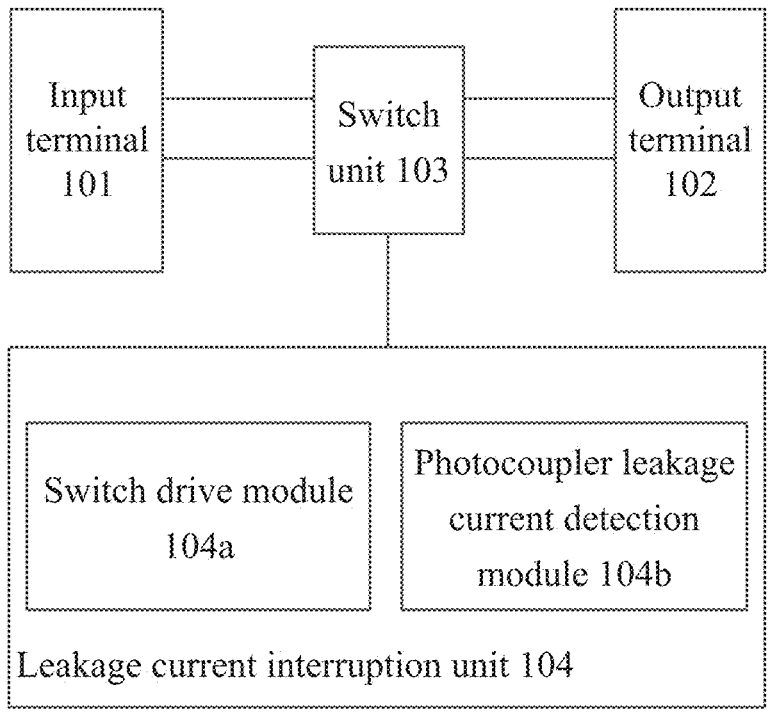
FIG. 1 illustrates an architecture of a power cord photocoupler LCDI according to the present disclosure.
Figure 2:
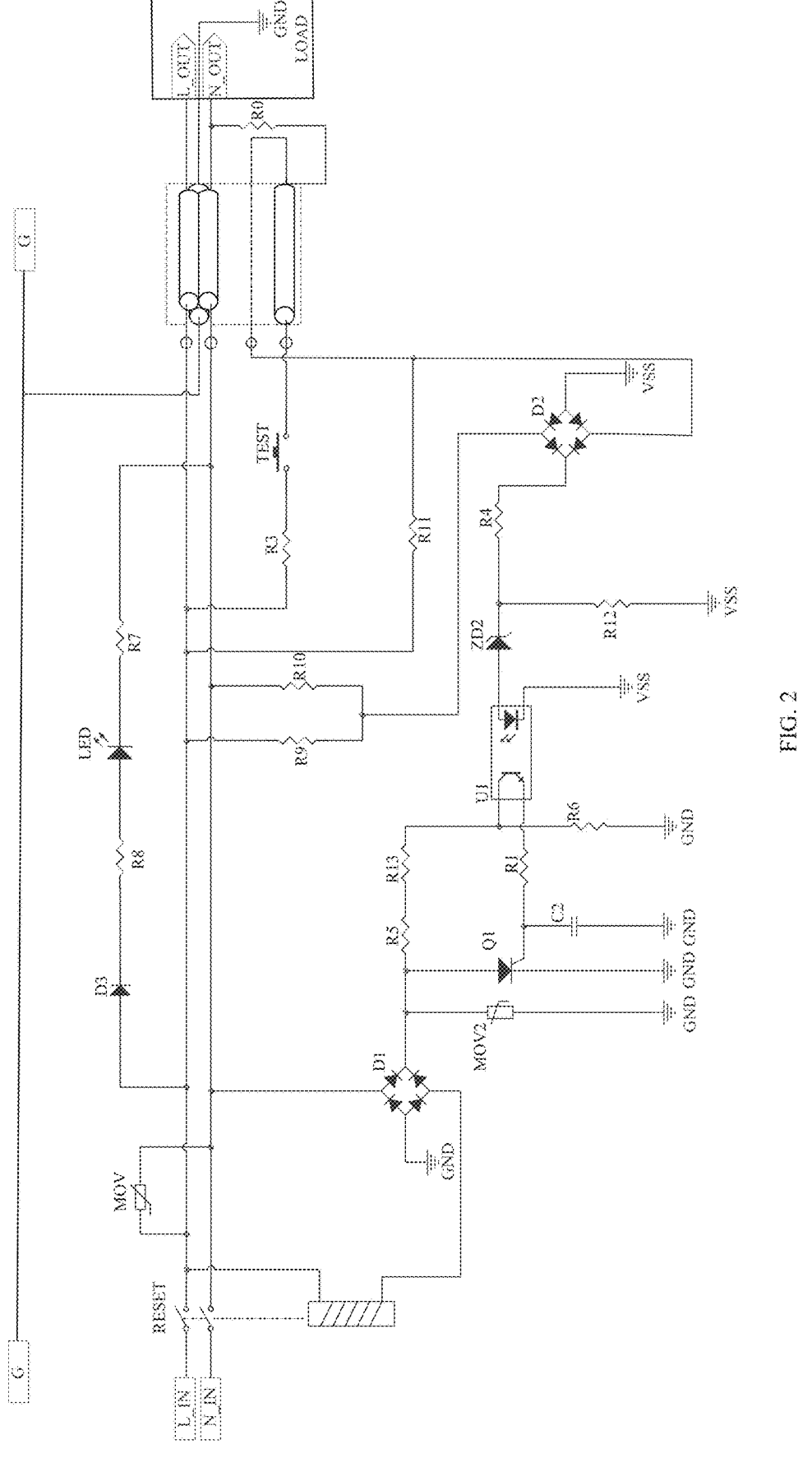
FIG. 2 illustrates a principle of a power cord photocoupler LCDI according to the present disclosure.

As shown in FIG. 1 to FIG. 2, the power cord photocoupler LCDI includes: the switch unit 103, the leakage current detection line 26 and the leakage current interruption unit 104.

The switch unit 103 is provided between input terminal 101 and output terminal 102, and configured to control the input terminal 101 and the output terminal 102 to turn on or off.

The leakage current detection line 26 wraps a power cord connected between the switch unit 103 and the output terminal 102, and is configured to detect whether the power cord has a leakage current. The leakage current detection line 26 is a bare copper wire. The leakage current detection line 26 detects whether the power cord has the leakage current. The leakage current detection line 26 may also be a reticulated copper wire covering other leads of the power cord.

The leakage current interruption unit 104 is connected to the switch unit 103 and the leakage current detection line 26, and configured to detect a leakage current signal of the leakage current detection line 26, and send a corresponding control signal to the switch unit 103 according to the leakage current signal.

Specifically, the leakage current interruption unit 104 includes the photocoupler leakage current detection module 104b and the switch drive module 104a.

The photocoupler leakage current detection module 104b includes one path connected to the leakage current detection line 26, and another path connected to the switch drive module 104a.

The photocoupler leakage current detection module 104b is configured to generate and send the control signal to the switch drive module 104a when detecting the leakage current signal of the leakage current detection line 26.

A control terminal of the switch drive module 104a is electrically connected to the switch unit 103. The switch drive module 104a is configured to generate the corresponding control signal according to the leakage current signal, thereby controlling the switch unit to turn off.

Specifically, the photocoupler leakage current detection module 104b includes ninth resistor R9, tenth resistor R10, eleventh resistor R11, second rectifier D2, fourth resistor R4 and photocoupler U1.

One path of an input-terminal line L is connected to an input-terminal line N through the ninth resistor R9 and the tenth resistor R10 to form a voltage regulating loop.

A first input terminal of the second rectifier D2 is connected to the voltage regulating loop. Another path of the input-terminal line L is connected to a second input terminal of the second rectifier D2 through the eleventh resistor R11.

An output terminal of the second rectifier D2 includes one path connected to the photocoupler U1 through the fourth resistor R4.

When the photocoupler leakage current detection module 104b is not triggered, the photocoupler U1 is not triggered through the ninth resistor R9 and the eleventh resistor R11 by a voltage input to the second rectifier D2.

When the photocoupler leakage current detection module 104b is triggered, the leakage current detection line 26 signally triggers the second rectifier D2 of the photocoupler leakage current detection module 104b, thereby driving an input terminal of the photocoupler U1 to emit light.

The photocoupler leakage current detection module 104b at least includes the ninth resistor R9, the eleventh resistor R11, the second rectifier D2, the fourth resistor R4 and the photocoupler U1 to form a detection loop of the photocoupler leakage current detection module 104b.

Specifically, voltage stabilizing tube ZD2 may be provided between a first output terminal of the second rectifier D2 and the input terminal of the photocoupler U1 to realize voltage stabilization and protection of the photocoupler U1.

Specifically, the input terminal of the photocoupler U1 is coupled to the photocoupler leakage current detection module 104b. An output terminal of the photocoupler U1 is coupled to the switch drive module 104a. The photocoupler U1 drives the switch drive module 104a by converting a photoelectric signal, thereby controlling the switch unit 103 to turn off.

Specifically, the switch drive module 104a includes solenoid SOL, first rectifier D1, fifth resistor R5, the photocoupler U1, first resistor R1, sixth resistor R6 and silicon controlled rectifier SCR.

One path of the input-terminal line L is grounded through the solenoid SOL, the first rectifier D1, the fifth resistor R5 and the sixth resistor R6 to form a static loop. The static loop is a current loop when the photocoupler U1 is not triggered.

The photocoupler U1 includes one path connected between the fifth resistor R5 and the sixth resistor R6 in the static loop, and another path connected to a gate of the silicon controlled rectifier SCR through the first resistor R1 to form a trigger loop. The trigger loop is a current loop when the photocoupler U1 is triggered.

The silicon controlled rectifier SCR includes an anode connected to a front terminal of the fifth resistor R5 in the static loop, the gate connected to the trigger loop, and a cathode grounded.

The trigger loop is configured to trigger the silicon controlled rectifier SCR to turn on.

When the output terminal of the photocoupler U1 is not triggered, the line L is connected to the solenoid SOL, the first rectifier D1, the fifth resistor R5 and the sixth resistor R6 and grounded to form the static loop, and the solenoid SOL is not triggered.

When the output terminal of the photocoupler U1 is triggered, the line L is connected to the solenoid SOL, the first rectifier D1, the fifth resistor R5, the photocoupler U1, the first resistor R1 and the second resistor R2 and grounded to form the trigger loop, thereby triggering the silicon controlled rectifier SCR to turn on. The silicon controlled rectifier SCR is connected in parallel to a second power loop, and makes the first rectifier D1 shorted out once connected, thereby triggering the solenoid SOL to generate a large current to form a large enough magnetic field. The switch unit 103 is tripped to cut off a power supply.

Specifically, the switch drive module 104a at least includes the solenoid SOL, the first rectifier D1, the fifth resistor R5, the output terminal of the photocoupler U1, the first resistor R1, the second resistor R2, the sixth resistor R6 and the silicon controlled rectifier SCR to form a drive loop of the switch drive module.

Specifically, the power cord photocoupler LCDI further includes the test unit. The test unit is connected between the input terminal and the output terminal and connected to the leakage current detection line. The test unit is configured to inject a current into the leakage current detection line 26 in an on state.

The leakage current detection line 26 is further configured to generate a leakage current signal according to an injected current. When the test unit is turned on, the switch drive module 104a controls the switch unit 103 according to the leakage current signal on the leakage current detection line 26 detected by the photocoupler leakage current detection module 104b.

Specifically, the test unit includes the test switch TEST 4 and the twelfth resistor R0. One path of the input-terminal line L is connected to the input-terminal line N through the test switch TEST, the additional signal line and the twelfth resistor R0 to form a test loop. The leakage current detection line is connected between the test switch TEST and the twelfth resistor R0.

When the test switch TEST 4 is closed, the test loop is turned on to actively connect the leakage current detection line 26. A leakage current signal of the leakage current detection line 26 triggers the second rectifier D2 of the photocoupler leakage current detection module 104b, thereby driving the input terminal of the photocoupler U1 to emit light. The output terminal of the photocoupler U1 is triggered, thereby driving the silicon controlled rectifier SCR to turn on. The first rectifier D1 of the switch drive module 104a is shorted out instantaneously, and the solenoid SOL generates a large current to form a large enough magnetic field. The switch unit 103 is tripped to cut off the power supply. By manually closing the test switch, whether the device cuts off the power supply can be detected.

As can be seen, the method for triggering the photocoupler U1 of the photocoupler leakage current detection module 104b to emit the light includes:

The power cord 2 is damaged, such that the leakage current detection line 26 is connected to form a current, thereby triggering the photocoupler leakage current detection module 104b and driving the photocoupler U1 to emit the light.

The power cord is tested manually, and the test unit is turned on actively, such that the leakage current detection line 26 is connected to form a current, thereby triggering the photocoupler leakage current detection module 104*b* and driving the photocoupler U1 to emit the light.

By implementing the technical solutions of the present disclosure, the power cord photocoupler LCDI has the automatic leakage current detection function and the manual leakage current detection function. With the dual leakage current detection functions, the present disclosure effectively improves the safety of the product.

<div align="center">Embodiment 2</div>

An objective of the present disclosure is to provide another power cord photocoupler LCDI. The power cord photocoupler LCDI realizes leakage current detection on a power cord through a photoelectric signal conversion function of a photocoupler.

Specifically, leakage current interruption unit 104 of the device includes a photocoupler leakage current detection module and a switch drive module. The leakage current interruption unit 104 is configured to detect and monitor whether a leakage current detection line in a power cord is disconnected. When the leakage current detection line in the power cord is disconnected, the device automatically cuts off a power supply to ensure safety of an electrical appliance.

The power cord photocoupler LCDI provided by the present disclosure includes: switch unit 103, the leakage current detection line 26 and leakage current interruption unit 104.

The switch unit 103 is provided between input terminal 101 and output terminal 102, and configured to control the input terminal 101 and the output terminal 102 to turn on or off.

The leakage current detection line 26 wraps a power cord connected between the switch unit 103 and the output terminal 102, and is configured to detect whether the power cord has a leakage current. The leakage current detection line 26 may be provided at any position of the power cord. The leakage current detection line 26 detects whether the power cord has the leakage current.

The leakage current interruption unit 104 is connected to the switch unit 103 and the leakage current detection line 26, and configured to detect a leakage current signal of the leakage current detection line 26, and send a corresponding control signal to the switch unit 103 according to the leakage current signal.

Specifically, the leakage current interruption unit 104 includes the photocoupler leakage current detection module 104*b* and the switch drive module 104*a*.

The photocoupler leakage current detection module 104*b* includes one path connected to the leakage current detection line 26, and another path connected to the switch drive module 104*a*.

The photocoupler leakage current detection module 104*b* is configured to generate and send the control signal to the switch drive module 104*a* when detecting the leakage current signal of the leakage current detection line 26.

A control terminal of the switch drive module 104*a* is electrically connected to the switch unit 103. The switch drive module 104*a* is configured to generate the corresponding control signal according to the leakage current signal, thereby controlling the switch unit to turn off.

Specifically, the switch unit 103, the leakage current detection line 26 and the leakage current interruption unit 104 are structurally and functionally the same as those in Embodiment 1.

The power cord photocoupler LCDI has the following working principle: When the power cord 2 is damaged, the leakage current detection line 26 is connected to form a current, thereby triggering the photocoupler leakage current detection module 104*b*.

By implementing the technical solutions of the present disclosure, the power cord photocoupler LCDI performs leakage current detection through photoelectric signal conversion of the photocoupler for, and has the advantages of a simple circuit structure, a low cost, etc.

<div align="center">Embodiment 3</div>

An electrical appliance using a power cord photocoupler LCDI includes the power cord photocoupler LCDI in any of the foregoing embodiments. The electrical appliance may be a household electrical appliance such as an air conditioner, a fan heater, a dehumidifier and a refrigerator.

By implementing the technical solutions of the present disclosure, the electrical appliance using the power cord photocoupler LCDI has dual leakage current detection functions to achieve higher safety.

The above are merely preferred specific implementations of the present disclosure, but the protection scope of the present disclosure is not limited thereto. Any equivalent replacement or modification made by a person skilled in the art according to the technical solutions of the present disclosure and inventive concepts thereof within the technical scope of the present disclosure shall fall within the protection scope of the present disclosure.

What is claimed is:

1. A power cord photocoupler leakage current detection interrupter (LCDI), comprising:

a switch unit provided between an input terminal and an output terminal, and configured to control the input terminal and the output terminal to turn on or off;

a leakage current detection line wrapped with a power cord, and configured to detect whether the power cord has a leakage current, wherein the power cord is connected between the switch unit and the output terminal;

a leakage current interruption unit connected to the switch unit and the leakage current detection line, and configured to detect a leakage current signal of the leakage current detection line, and send a corresponding control signal to the switch unit according to the leakage current signal;

a test unit connected between the input terminal and the output terminal and connected to the leakage current detection line, the test unit including a test switch disposed in a plug portion, an additional signal line routed within the power cord and disposed beneath a metal outer layer of the power cord, and a discrete resistor disposed within the power cord beneath the metal outer layer; wherein the leakage current detection line is connected between the test switch and the discrete resistor; and wherein closing the test switch injects a current into the leakage current detection line through a test loop that includes the additional signal line and the discrete resistor within the power cord; and the plug portion and the power cord, wherein the power cord is externally connected to the plug portion; the plug portion is configured to mount the switch unit, the leakage current interruption unit and the test unit; and the power cord comprises an insulated protective layer covering the metal outer layer, a live line, a neutral line, a ground line, the leakage current detection line, the additional signal line and the discrete resistor, wherein the metal outer layer covers the live line, the neutral line, the ground line, the leakage current detection line, the additional signal line and the discrete resistor.

2. The power cord photocoupler LCDI according to claim 1, wherein the leakage current interruption unit comprises a photocoupler leakage current detection module and a switch drive module;

the photocoupler leakage current detection module comprises a first path connected to the leakage current detection line, and a second path connected to the switch drive module, and is configured to generate and send the control signal to the switch drive module when detecting the leakage current signal of the leakage current detection line; and a control terminal of the switch drive module is electrically connected to the switch unit, and configured to generate the corresponding control signal according to the leakage current signal, wherein the switch unit is controlled to turn off.

3. An electrical appliance using a power cord photocoupler leakage current detection interrupter (LCDI), comprising the power cord photocoupler LCDI according to claim 2.

4. The power cord photocoupler LCDI according to claim 1, wherein the discrete resistor is a first resistor, and the photocoupler leakage current detection module comprises a second resistor, a third resistor, a fourth resistor, a first rectifier, a fifth resistor and a photocoupler;

a first path of an input-terminal line L is connected to an input-terminal line N through the second resistor and the third resistor to form a voltage regulating loop;

a first input terminal of the first rectifier is connected to the voltage regulating loop; and a second path of the input-terminal line L is connected to a second input terminal of the first rectifier through the fourth resistor; and an output terminal of the first rectifier comprises a path connected to the photocoupler through the fifth resistor.

5. An electrical appliance using a power cord photocoupler leakage current detection interrupter (LCDI), comprising the power cord photocoupler LCDI according to claim 4.

6. The power cord photocoupler LCDI according to claim 4, wherein a switch drive module comprises a solenoid, a second rectifier, a sixth resistor, the photocoupler, a seventh resistor, an eighth resistor and a silicon controlled rectifier;

a path of the input-terminal line L is grounded through the solenoid, the second rectifier, the sixth resistor and the eighth resistor to form a static loop; and the static loop is a current loop when the photocoupler is not triggered;

the photocoupler comprises a first path connected between the sixth resistor and the eighth resistor in the static loop, and a second path connected to a gate of the silicon controlled rectifier through the seventh resistor to form a trigger loop; and the trigger loop is a current loop when the photocoupler is triggered;

the silicon controlled rectifier comprises an anode connected to a front terminal of the sixth resistor in the static loop, the gate connected to the trigger loop, and a cathode grounded; and the trigger loop is configured to trigger the silicon controlled rectifier to turn on.

7. An electrical appliance using a power cord photocoupler leakage current detection interrupter (LCDI), comprising the power cord photocoupler LCDI according to claim 6.

8. The power cord photocoupler LCDI according to claim 1, wherein a path of an input-terminal line L is connected to an input-terminal line N through the test switch, the additional signal line and the discrete resistor to form the test loop.

9. An electrical appliance using a power cord photocoupler leakage current detection interrupter (LCDI), comprising the power cord photocoupler LCDI according to claim 8.

10. The power cord photocoupler LCDI according to claim 8, wherein the plug portion is further provided with a test switch button and a reset switch button.

11. An electrical appliance using a power cord photocoupler leakage current detection interrupter (LCDI), comprising the power cord photocoupler LCDI according to claim 10.

12. The power cord photocoupler LCDI according to claim 10, wherein the plug portion is further provided with a startup indication lamp; and the startup indication lamp is connected to a power loop.

13. An electrical appliance using a power cord photocoupler leakage current detection interrupter (LCDI), comprising the power cord photocoupler LCDI according to claim 12.

14. An electrical appliance using a power cord photocoupler leakage current detection interrupter (LCDI), comprising the power cord photocoupler LCDI according to claim 1.

* * * * *